US005162398A

United States Patent [19]

Katz

[11] Patent Number: 5,162,398

[45] **Date of Patent: * Nov. 10, 1992**

[54] COMPOSITE PROTECTIVE MATERIALS, THEIR PRODUCTION AND ARTICLES MADE THEREOF

[75] Inventor: Moshe Katz, Rishon Le-Zion, Israel

[73] Assignee: The State of Israel, Atomic Energy Commission, Soreq Nuclear Research Center, Yavne, Israel

[ * ] Notice: The portion of the term of this patent subsequent to Oct. 10, 2006 has been disclaimed.

[21] Appl. No.: 98,951

[22] Filed: Aug. 27, 1987

[30] Foreign Application Priority Data

Sep. 5, 1986 [IL] Israel ........................................ 79955
Aug. 12, 1987 [IL] Israel ........................................ 83511

[51] Int. Cl.[5] ......................... B32B 5/24; B32B 27/20

[52] U.S. Cl. .................................... 523/222; 428/244; 428/284; 428/286; 428/290; 428/913; 428/920

[58] Field of Search ............... 428/244, 290, 284, 286, 428/913, 920; 523/222

[56] References Cited

U.S. PATENT DOCUMENTS 2,438,176 3/1948 Lantz et al. .
3,457,918 6/1969 Debelius et al. ................. 128/142.5
4,454,191 6/1984 von Blucher et al. .............. 428/244
4,554,198 11/1985 von Blucher et al. .............. 428/143
4,565,727 1/1986 Giglia et al. ......................... 428/286
4,872,220 10/1989 Haruvy et al. ...................... 428/286

FOREIGN PATENT DOCUMENTS 0037745 10/1981 European Pat. Off. .
1173143 12/1969 United Kingdom .
2167053 5/1986 United Kingdom .

OTHER PUBLICATIONS

*Chemical Abstracts*, vol. 84, No. 26, Jun. 28, 1976, p. 67, abstract No. 181586y, Columbus, Ohio, US; and JP-A-76 017 377 (Kuraray Co., LTD) Dec. 2, 1976.

*Primary Examiner*—Jenna L. Davis
*Attorney, Agent, or Firm*—Browdy and Neimark

[57] ABSTRACT

Protective composite material suitable for the making of protective garments and other protective articles to afford protection against weather hazards as well as against noxious and toxic chemicals and biological substances. The protective material comprises at least one continuous, non-porous and non-foamed synthetic material and optionally at least one additive capable of binding chemical and biological substances. The protective material according to the invention excels by good thermal conductivity in combination with a good water transportation capacity and accordingly protective garments made therefrom have good heat stress relief capability.

21 Claims, 3 Drawing Sheets

COMPOSITE PROTECTIVE MATERIALS, THEIR PRODUCTION AND ARTICLES MADE THEREOF

FIELD OF INVENTION

The present invention relates to material having protective properties, and to various articles such as protective garments, canvases used as covers and partitions and others made therefrom. The protective materials and articles provided in accordance with the invention are adapted to afford protection against weather hazards, such as rain or wind, and/or protection against noxious and toxic chemicals in the form of vapours, aerosols and particulates.

In the following disclosure, the invention will be described occasionally with specific reference to protective clothing, it being understood that it is not confined thereto and that other articles are also contemplated such as, for example, sheets or canvases for making of weather resistant or chemically insulated enclosures in the form of tents or sheds for the protection of humans and animals from weather hazards or a toxic environment; for sealing of openings such as windows and doors to insulate a house from a poisonous environment; for maintaining sterile or clean environments as required in clean rooms and hospitals; and the like.

BACKGROUND OF THE INVENTION AND PRIOR ART

The basic role of protective clothing is to prevent hazardous toxic materials such as chemicals, microorganisms and the like from coming into contact with the living body; to protect from weather hazards; etc.

In principle, such results can be accomplished by making the clothing from a continuous barrier material which is impermeable to water, wind and/or any hazardous or undesirable substances present in the surrounding atmosphere. Impermeable protective clothing, as known to date, however, imposes intolerable restrictions on the natural process of heat dissipation from the human body, which normally occurs by sweat evaporation. The restriction on the thermal regulation of the human body by impermeable protective clothing induces development of thermal stress which may lead in extreme cases to thermal shock and death. Therefore impermeable protective clothing was found unsuitable for prolonged use under any condition, and in particular when the user is expected to perform intensive physical labour.

It is widely accepted in the art that in order to solve the thermal stress problem of protective clothing, adequate means for eliminating the sweat from the interior of the suit to the environment must be found.

Until now, this problem was addressed by using porous protective materials, which allow free flow of air and other gases through their pores and selectively removing or trapping the damaging components present in the surroundings. An example of an embodiment of this approach are the Gortex (trade mark) sport and rainwear which are made of microporous polytetra fluoro ethylene (PTFE), which allows relatively free passage of gases and water vapor but is not wetted by liquid water, thus providing very efficient water repelency combined with permeability to water vapors and air. Another example of this kind of protective clothing are the so-called "breathing" CBA (chemical, biological, atomic) protective suits, which are based on activated carbon impregnated porous textiles, felts or sponges, which are open to free flow of air. These "breathing" protective clothes allow elimination of the sweat through the pores of the textile while at the same time toxic compounds are adsorbed by the activated charcoal.

While this "breathing" air-permeable protective clothing makes allowance for and reduces the problem of heat dissipation by sweat evaporation, it has the inherent drawback of being permeable also to hazardous vapours, aerosols and particulate materials. Furthermore, the so-called "breathing" clothing are characterized by intrinsic bulkiness due to the fact that they are designed for carrying relatively large loads of adsorbent material required to provide protection against toxic chemicals during a reasonably sufficient period of time. It is also well recognized that the breathing materials also do not provide adequate solution to the physiological load and heat stress problems of the chemical protective garments, and they also may lead to incapacitation and thermal shock and even death under conditions of severe work loads, and high temperatures and humidity. In spite of these inherent short-comings, so far no better solutions have been found and the protective clothing made of "breathing" materials are widely used both for civil and military applications.

German patent specifications DE-A1-31 323 24 and DE-A1-32 009 42 disclose moisture permeable, waterproof airtight textile materials and their use for protective purposes and one of the disclosed embodiments is allegedly applicable for CBA protection. According to the disclosure in these two patent specifications foamed synthetic polymers such as foamed polyurethane, are used with the object of exercising a buffer effect by absorbing sweat as it develops and gradually releasing it to the atmosphere. Several features of the materials disclosed in these patents indicate, however, that they cannot provide simultaneously adequate heat stress relief and chemical protection.

One of the main problems inherent in the protective materials and garments disclosed in DE-A1-31 323 24 and DE-A1-32 009 42 concern their thermal conductivity. It can easily be shown that in order to allow adequate cooling of the body, protective clothing, in addition to being water permeable should also have an as high as possible thermal conductivity and to this end any void due to entrapped gas bubbles should be eliminated as far as possible from the structure of the protective material, having regard to the thermal insulating properties of such voids. The foamed synthetic polyurethane materials used in accordance with the above two German patent specifications have intrinsically a large number of voids and consequently do not allow for adequate body heat dissipation.

Furthermore, due to the accumulation of sweat in the foamed synthetic material in accordance with the teachings of the said two German patent specifications, there results a considerable added weight which contributes significantly to the wearer's discomfort.

The materials described in the above two German patent specifications are not satisfactory, even as far as moisture dissipation is concerned. Thus, the moisture permeability of the protective textiles according to DE-A1-31 323 24 is limited to values of up to 42 $g/m^2/h$ which is considerably lower than the values of 250–500 $g/m^2/h$ eliminated by the human body as sweat during periods of intensive activity.

Moreover, even a capability of eliminating sweat by permeation at a rate of 250–500 $g/m^2/h$ or higher, dictated by metabolism, does in itself not necessarily provide the desired cooling effect to the human body. The vaporization heat absorbed during the evaporation process is taken from the immediate vicinity of the evaporation surface. Therefore the efficiency of the cooling effect of the human body depends on the distance of this evaporation surface from the body and on the thermal conductivity of the medium which separates this evaporation surface from the skin. When sweat evaporation occurs in the pores of the human skin itself, the cooling effect achieved is the most efficient possible. However, in the case of a protective garment, particularly if it is airtight even if water permeable, the sweat evaporation may essentially occur only on the external surface of the protective barrier, which is not necessarily in close contact with the skin. As a result, in such cases the cooling efficiency with regard to the human body will be considerably lower than the values expected from considering the amount of sweat eliminated by the body. This effect is aggravated when the protective barrier has a relatively low thermal conductivity in consequence of a porous or foamy structure. Thus, in experiments conducted preparatory to the present invention with known porous, "breathing" protective suits it was shown that even where, in consequence of permeability, the rate of moisture transport was of the order of 250–500 $g/m^2/h$ as required by human metabolism, such suits caused inadequately high levels of heat stress in spite of their air permeability. This was true in particular in regard to suits which were based on polyurethane foams and it demonstrates the importance of thermal conductivity for the provision of adequate heat relief.

Summing up, the protective materials and garments disclosed in DE-A1-31 323 24 and DE-A1-32 009 42 have serious intrinsic deficiencies and the disclosure does not provide any evidence that adequate chemical protection and/or heat stress relief was or indeed can be achieved by the disclosed methods and materials.

There are known in the art various non-porous materials with yet a sufficiently high permeability to water to allow efficient thermal regulation of the body by natural sweat and heat elimination processes, examples being polymers such as polyvinyl alcohol, polyvinyl pyrrollidone, acrylamide polymers, polyurethanes, etc. It is also known to impart water permeability properties to common, water impermeable synthetic poly meric materials by grafting techniques. However, while the water permeability of known materials obtained in this way is occasionally sufficiently high to allow water transport rates comparable to the sweating rate of an average person performing intensive physical work, such permeability is as a rule accompanied by a permeability to toxic gases with the consequence that such materials are inadequate for protection against noxious and toxic chemicals in the form of vapors and aerosols.

It is the object of the present invention to overcome the deficiencies of the prior art and provide a non-porous protective material which has yet a sufficiently high water permeability and thermal conductivity to enable adequate heat and moisture dissipation and thereby to afford adequate cooling of the body during intensive labour and at the same time also effective protection against weather hazards and/or noxious and toxic chemicals in the form of vapours, aerosols and particulates.

GENERAL DESCRIPTION OF THE INVENTION

In accordance with the present invention there is provided for use in the production of protective articles, a water permeable material comprising at least one non-porous and non-foamed continuous synthetic material.

A non-porous and non-foamed synthetic polymeric material employed for the purposes of the present invention will hereinafter occasionally be referred to for short as "synthetic material".

The protective material according to the invention may be non-supported or be compounded with a loose fiber or textile material filler for enhancing mechanical strength and dimensional stability, and/or for imparting additional properties like fire resistance, specific surface properties, etc. The fibers or textiles with which the protective material according to the invention may optionally be compounded may be homogeneously admixed with said synthetic material to form a single layer composite, or may alternatively be joined separately to form a multi-layer composite with each layer having its specific function. In case of such a multi-layer composite it is preferable to fill the space between the loose or textile fibers with a continuous matrix of said synthetic material in order to eliminate air gaps and entrapped air bubbles as much as possible and thereby enhance the thermal conductivity of the compounded protective material. The synthetic material employed in accordance with the invention may have a uniform, isotropic structure or may have a non-isotropic structure provided it includes in addition to any porous layer also a continuous porefree layer. By being continuous and porefree the protective materials according to the invention are of necessity airtight.

The invention further provides protective articles, e.g. garments, made of a protective material as specified above.

When chemical protection is required, the protective material according to the invention may be compounded with an additive such as activated charcoal and/or any other material capable of adsorbing, absorbing, detoxifying or reacting with noxious or toxic chemical or biological substances present in the surrounding atmosphere.

In this case, the chemical protection is shared by the airtight synthetic material and by the activated charcoal such that the bulk of the toxic material and the toxic vapors are rejected by the airtight synthetic material, and whatever penetrates this barrier is trapped by the activated charcoal. Therefore, in these protective materials, considerably lower activated charcoal loads may provide adequate chemical protection and thus the protective suits based on the principles according to this invention are considerably thinner and lighter than those based on the "breathing" protective materials.

The airtight protective material according to the invention excels over the prior art in that it combines good thermal conductivity and water transport properties which is of primary importance for the heat stress relief capability of protective garments. This extremely important combined effect is due to the non-porous non-foamed nature of the synthetic material which allows for good heat conductivity and moisture transportation without undue sweat accumulation. In consequence, protective garments made in accordance with the teachings of this invention have been shown to provide surprisingly good heat relief qualities, significantly better than those of the known "breathing" protective materials which latter were considered hitherto as the best solution known to the problem of heat stress relief in protective garments. It is also clearly evident that the mechanisms of both the chemical protection and heat dissipation in these materials are fundamentally different from those in the known "breathing" protective materials. Therefore, the present invention provides a new and advanced solution to the problem of heat stress relief in protective clothing. In fact it was shown that the heat and moisture dissipating properties of materials according to the invention are comparable to those of ordinary textile materials.

The protective material according to the invention is highly versatile in its application and can be used for many different purposes. Thus, for example, it can be used for rainwear, water and maritime sport gear and wear, hospital and clean room clothing, etc. In these and other similar applications protection from noxious and poisonous chemicals is not required and therefore no additives will as a rule be included. Where, on the other hand, the material serves for making garments and gear to be used for protection under hazardous conditions, such as in fire extinction, in various exposed activities in the chemical and nuclear industries, in chemical warfare and the like, suitable additives will be included.

Where activated charcoal is used in making the protective materials according to the invention, it is preferably embedded in a matrix of the said synthetic material and in this way it is protected from deactivation by sweat and atmospheric pollution in the form of fuels, oils, etc. If desired, however, it is also possible to add the activated charcoal as a separate layer.

In order to avoid deactivation of the activated charcoal during the preparation of the composite protective materials according to the invention in consequence of interaction with the solvent and/or other components, adequate treatment of the activated charcoal as known per se, may be necessary prior to its compounding with the said synthetic material. Thus, where the solvent is water, elimination of polar hydrophilic groups from the surface of the activated charcoal may be necessary, e.g. by heating the charcoal under a hydrogen atmosphere followed by washing with HCl or HF.

The synthetic material used in accordance with the invention is preferably rendered resistant against warm water, e.g. by cross-linking, in order to enable its laundering without losing its protective properties. It is also preferred that the protective material according to the invention is rendered fire resistant, whereby yet another form of protection is provided. Methods of rendering textile and polymeric materials resistant against fire and hot water are known per se and need not, therefore, be described.

The water permeability of a polymeric synthetic material to be employed for the purposes of the present invention may be determined, for example, by wetting one side of the material and exposing the other side to an atmosphere of relative humidity of 30% and a temperature of 37° C. Under such conditions the water permeability rate should preferably be at least 300 $g/m^2/h$.

DESCRIPTION OF THE DRAWINGS

The heat and moisture dissipating properties of a protective garment made of a protective material according to the invention is illustrated in the accompanying drawings in which.

Figure 1:
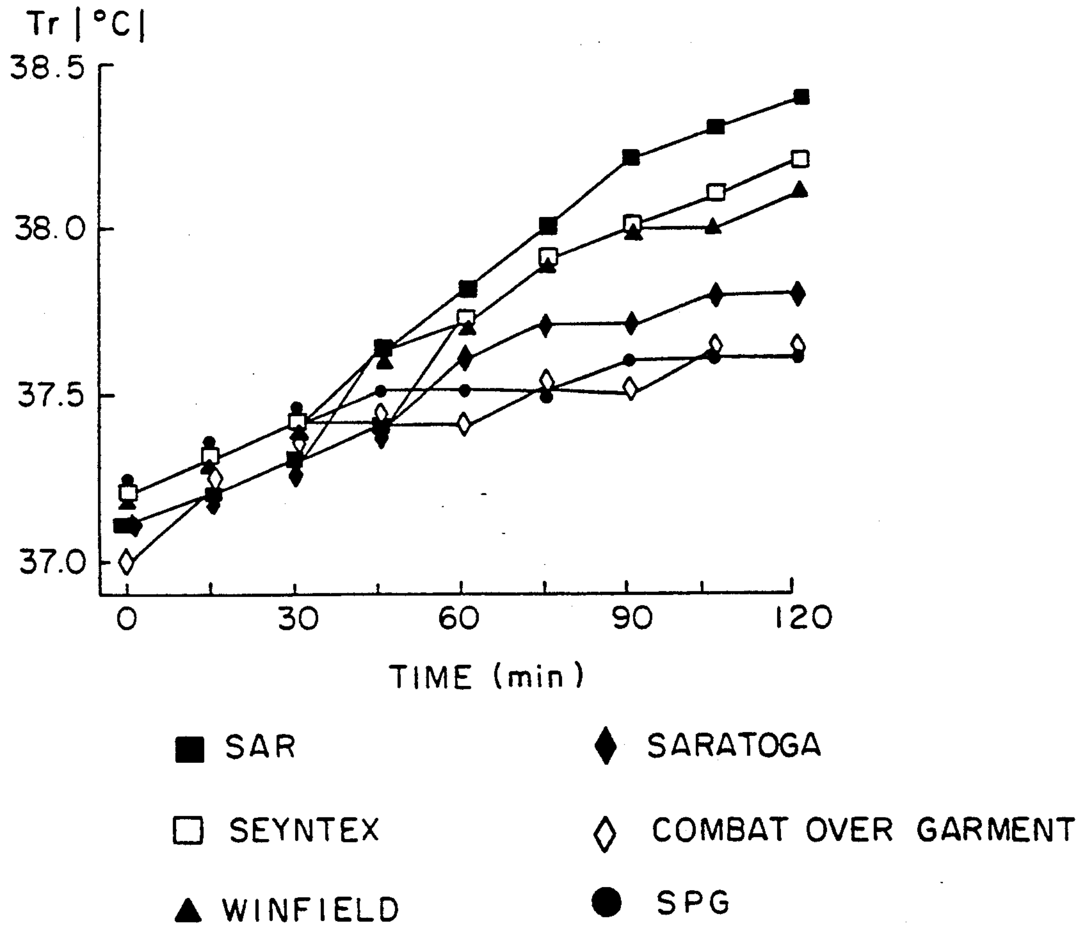
FIG. 1 is a graphic representation showing the change of rectal temperature with time of subjects wearing garments of different materials and exposed to heat and moisture.
Figure 2:
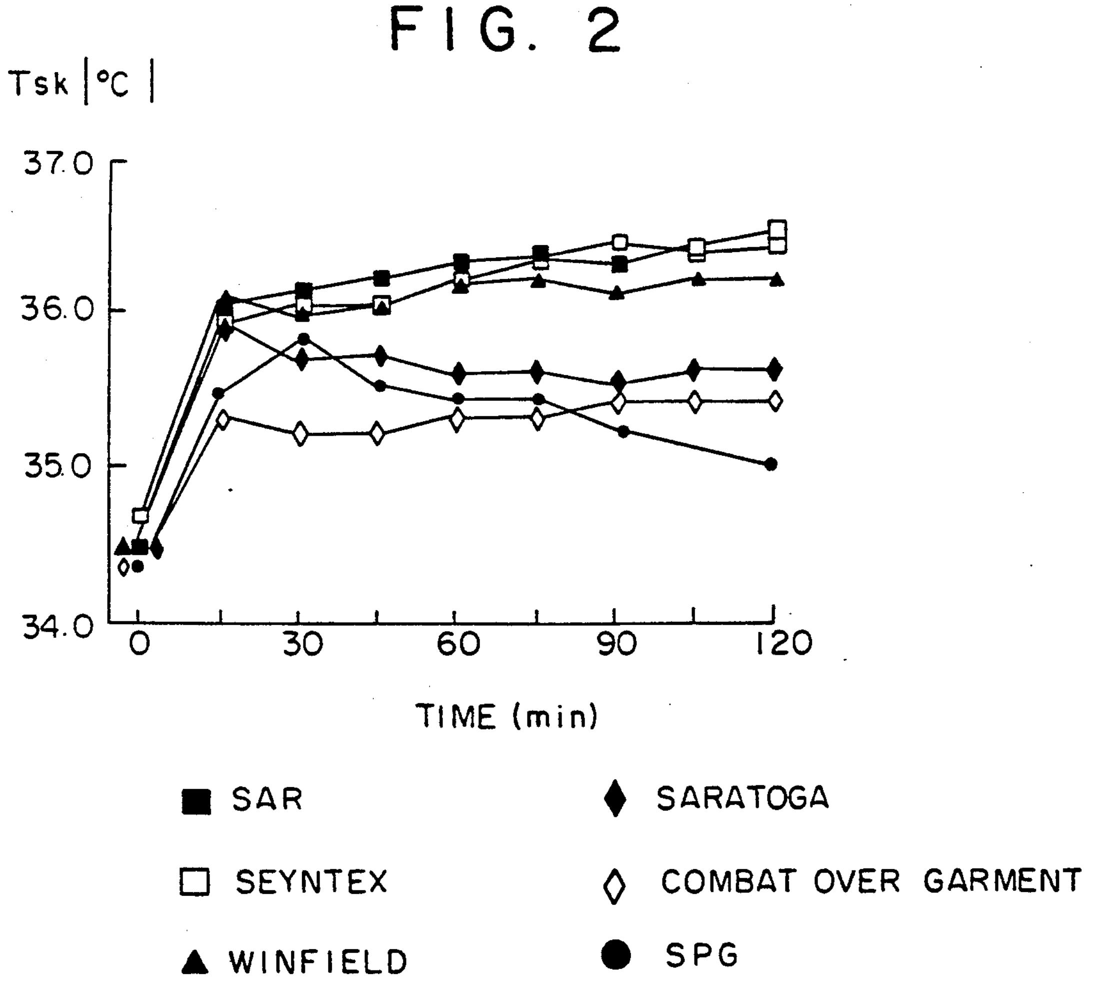
FIG. 2 is a similar representation of the change of skin temperature.
Figure 3:
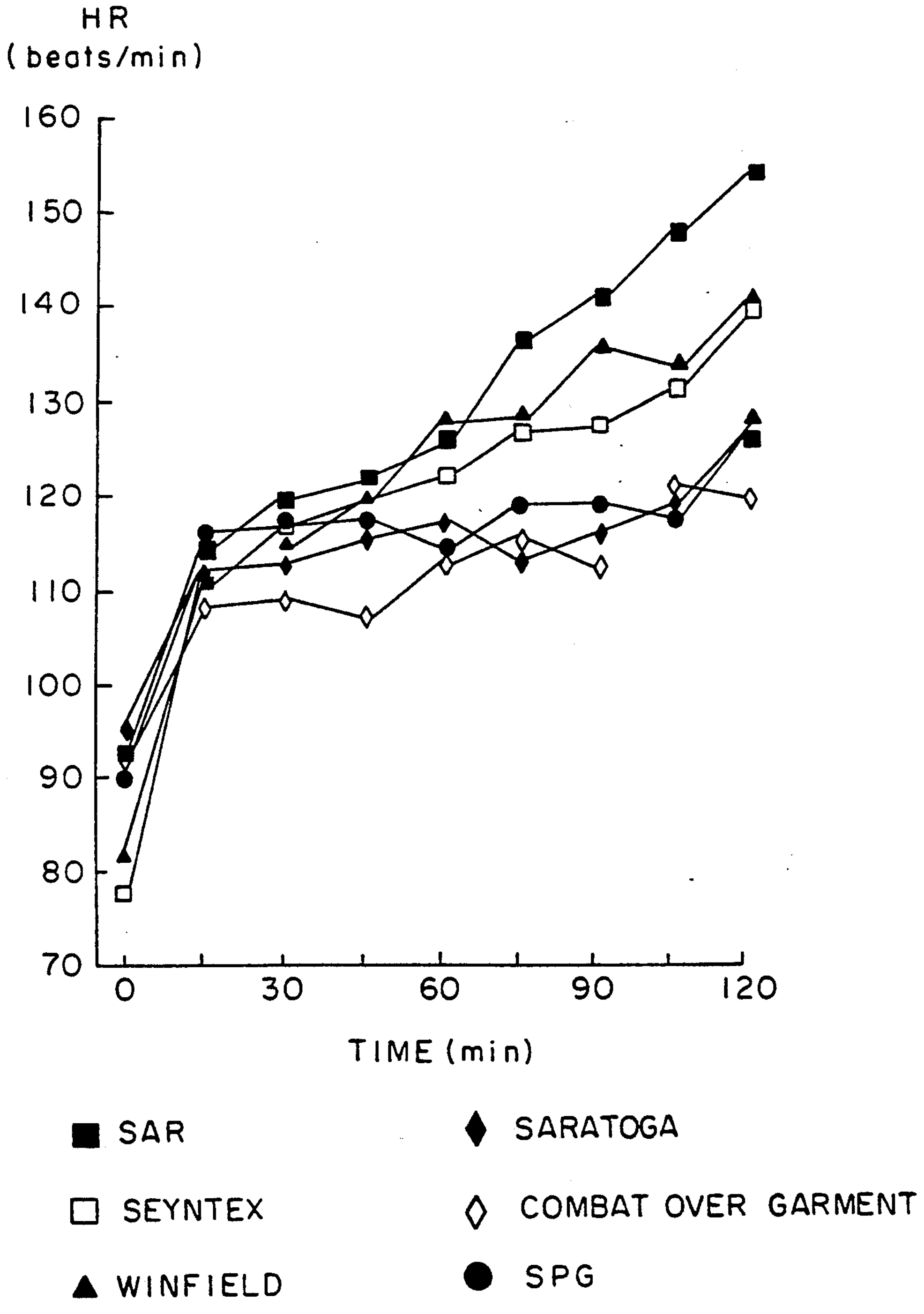
FIG. 3 is a similar representation of the change of heart beat rate.

The various designations used in the Figures denote protective garments of the following origin:

SAR—von Bluecher;

Seyntex—a Belgian company by that name;

Winfield—a U.S. company by that name;

Saratoga—von Bluecher.

Combat overgarment—plain cotton garment as used by the Israel Defence Force;

SPG—Soreq Protective Garment, a garment according to the invention made of material prepared in accordance with Example 6 below and having a water permeability at 37° C. and 30% relative humidity (RH) of about 350 $g/m^2/h$.

Subjects wearing these garments were exposed for 120 minutes at 30° C., 60% RH while performing light to moderate work consisting of continuous stepping on a 32 cm. high bench at the rate of 12 steps/minutes. During the exposure, rectal temperature, skin temperature and heart rate were monitored every 15 minutes. After 120 minutes exposure, rectal temperatures reached 37.4°, 37.6° and 37.8° C. for SPG. combat overgarment and Saratoga garments, respectively. The skin temperature reached 35.0°, 35.4° and 35.6° C. for the SPG, combat overgarment and Saratoga garment, respectively. The heart rate reached 118, 115 and 123 beats per minute for the SPG, combat overgarment and Saratoga garments, respectively. These findings indicate that from the point of view of heat release the performance of SPG is better even than that of the plain cotton suits and is significantly superior to that of the "breathing" Saratoga garment.

DESCRIPTION OF SPECIFIC EMBODIMENTS

The invention will now be further illustrated by the following Examples to which it is not limited:

EXAMPLE 1 a. 200 g PVA (polyvinyl alcohol #30573, BDH), a non-ionic material and 150 g Glycerol (Frutarom CP) were dissolved in 1050 g water. (I)

b. 5 g of active charcoal grains (200–300 mesh, BDH) were heated under hydrogen atmosphere at 1000° for 60 minutes, after washing with concentrated HCl and with concentrated HF, in order to remove residual oxygenated hydrophilic structures. After this treatment the active charcoal was mixed with 40 g of (I) to form a smooth paste (II).

c. Onto a $30\times20$ $cm^2$ cotton fabric (a 70 $g/m^2$ commercially available cotton fabric, processed for flame retardancy and water and oil repellancy) 40 g of (II) were applied using a doctor blade, to produce a uniform layer covering the cloth, yielding a composite product (III).

d. (III) was dried for 72 hours at room temperature, to form a stable, non-porous flexible, active charcoal loaded fabric (IV), which has a continuous PVA surface and which has a high thermoconductivity and water permeability that make it suitable for production of protective clothing in accordance with the invention.

EXAMPLE 2

Same as in Example 1, except that in step b. the hydrogen gas atmosphere was replaced by dry $NH_3$ atmosphere.

EXAMPLE 3 a. to c. Same as in Example 1 (I-III)

d. (III) was crosslinked by electron beam irradiation (520 kV, 4 mA, 9.6 Mrads) to form a hot-water-stable flexible charcoal supporting fabric with continuous PVA surface (III').

e. (III') was dried for 72 h at room temperature (IV').

EXAMPLE 4 a. to d. Same as in Example 1.

e. (IV) was covered with a thin layer of (I) and then with a cotton fabric (V).

f. (V) was dried for 75 h at room temperature.

EXAMPLE 5 a. to e. Same as in Example 3.

f. (IV') was covered with a thin layer of (I) and then with a cotton fabric (V').

g. (V') was crosslinked again as described under d. in Example 3 (VI').

h. (VI') was dried for 75 h at room temperature.

EXAMPLE 6 a. Same as in Example 1, adding 10 g of ammonium dichromate to the PVA solution (I'').

b. to d. Performed same as in Example 1, to form a crosslinked, hot-water-stable flexible charcoal loaded fabric (IV'') and having a continuous PVA surface.

EXAMPLE 7 a. to d. Same as in Example 6.

e. (IV'') was covered with a thin layer of (II'') and then with cotton fabric (V'').

f. Same as in Example 4.

EXAMPLE 8 a. to f. Same as in Example 7, except that in step e., the cotton fabric was replaced with a Nomex (trade mark, aromatic polyamide of DuPont) fabric.

EXAMPLE 9 a. to f. Same as in Example 7, except that in step e., the cotton fabric was replaced with Hylla (trade mark, a cotton-polyurethane-glass three layered fabric of von Bluecher).

It has been found that protective materials exemplified hereinbefore provided protection for over two hours against 1 microliter droplets of various CBA materials, and had water permeabilities higher than 300 g/m²h determined at 37° C. and 30% RH by a modified ASTM method E96-66T.

I claim:

1. For use in the production of protective articles having enhanced heat stress relief properties, a water-permeable material comprising at least one continuous, non-porous and non-foamed, non-ionic synthetic material selected from the group consisting of polyvinyl alcohol, polyvinyl pyrrollidone, acrylamide polymer, and polyurethane having activated charcoal homogeneously distributed within said synthetic material.

2. Material according to claim 1 compounded with a filler selected from the group of fibrous and textile materials.

3. Material according to claim 2 wherein spaces between fibers are filled with a continuous matrix of said synthetic polymeric material.

4. Material according to claim 2 wherein said filler is homogeneously distributed in said synthetic polymeric material whereby a single layer composite is formed.

5. Material according to claim 2 wherein said filler is joined to said synthetic polymeric material whereby a multilayer composite is formed.

6. Material according to claim 1 wherein said synthetic material is a cross-linked polymeric material.

7. A material according to claim 1 wherein said non-ionic synthetic material is polyvinyl alcohol.

8. A protective article comprising a water-permeable material comprising at least one continuous, non-porous and non-foamed, non-ionic synthetic material selected from the group consisting of polyvinyl alcohol, polyvinyl pyrrollidone, acrylamide polymer, and polyurethane having activated charcoal homogeneously distributed within said synthetic material.

9. A protective article according to claim 8 wherein said water permeable material is compounded with a filler selected from the group of fibrous and textile materials.

10. A protective article according to claim 9 wherein spaces between fibers are filled with a continuous matrix of said synthetic polymeric material.

11. A protective article according to claim 9 wherein said filler is homogeneously distributed in said synthetic polymeric material whereby a single layer composite is formed.

12. A protective article according to claim 9 wherein said filler is joined to said synthetic polymeric material whereby a multilayer composite is formed.

13. An article according to claim 8 adapted for protection against fire.

14. An article according to claim 8 adapted for use against chemical hazards.

15. An article according to claim 8 adapted for use against biological hazards.

16. An article according to claim 8 adapted for use against atomic hazards.

17. An article according to claim 8 being a garment.

18. A protective article according to claim 8 wherein said synthetic material is a cross-linked polymeric material.

19. In a method for the production of a protective article having enhanced heat stress relief properties, comprising fabricating said article from a sheet material, the improvement wherein said sheet material is a water permeable material comprising at least one continuous, non-porous and non-foamed, non-ionic synthetic material selected from the group consisting of polyvinyl alcohol, polyvinyl pyrrollidone, acrylamide polymer, and polyurethane containing activated charcoal homogeneously distributed within said synthetic material.

20. In a method of manufacturing a protective article from a water permeable sheet material, comprising forming said protective article from said water permeable sheet material, the improvement wherein said water permeable sheet material comprises at least one continuous, non-porous, water resistant and non-foamed, non-ionic synthetic material selected from the group consisting of polyvinyl alcohol, polyvinyl pyrrollidone, acrylamide polymer, and polyurethane containing activated charcoal homogeneously distributed within said synthetic material.

21. A method according to claim 20; wherein said continuous, non-porous and non-foamed synthetic material has a rate of moisture transport on the order of 250–500 g/m²/h.

* * * * *